(12) United States Patent
Liu et al.

(10) Patent No.: US 11,726,877 B1
(45) Date of Patent: Aug. 15, 2023

(54) METHOD, ELECTRONIC DEVICE, AND COMPUTER PROGRAM PRODUCT FOR ACCESSING STORAGE DEVICE

(71) Applicant: DELL PRODUCTS L.P., Round Rock, TX (US)

(72) Inventors: Bing Liu, Tianjin (CN); Zheng Li, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/731,132

(22) Filed: Apr. 27, 2022

(30) Foreign Application Priority Data

Feb. 25, 2022 (CN) .......................... 202210179300.5

(51) Int. Cl.
*G06F 11/07* (2006.01)
*G06F 11/10* (2006.01)

(52) U.S. Cl.
CPC ...... *G06F 11/1076* (2013.01); *G06F 11/0757* (2013.01); *G06F 11/0772* (2013.01); *G06F 11/0784* (2013.01)

(58) Field of Classification Search
CPC ............. G06F 11/0757; G06F 11/0772; G06F 11/0784; G06F 11/1076
USPC .................................................. 714/6.22, 43
See application file for complete search history.

(56) References Cited

U.S. PATENT DOCUMENTS

| | | | | |
|---|---|---|---|---|
| 8,443,119 B1 * | 5/2013 | Limaye | ............... | G06F 11/2023 710/33 |
| 10,833,979 B2 * | 11/2020 | Colpo | ..................... | G06F 9/526 |
| 2009/0187708 A1 * | 7/2009 | Kurokawa | ............ | G06F 3/0617 711/E12.019 |
| 2021/0103506 A1 * | 4/2021 | Marappan | ............... | H04L 67/55 |
| 2021/0232468 A1 * | 7/2021 | Tidke | .................... | G06F 3/0619 |

FOREIGN PATENT DOCUMENTS

JP 2017010390 A * 1/2017 ......... H04L 41/0672

* cited by examiner

*Primary Examiner* — Chae M Ko
(74) *Attorney, Agent, or Firm* — Womble Bond Dickinson (US) LLP

(57) ABSTRACT

Embodiments of the present disclosure provide a method, an electronic device, and a computer program product that involve accessing a storage device. The method includes determining, in response to an access to the storage device via a first path being determined as timeout, whether an error on the first path is of a first error type. The method further includes causing the access to be suspended for at least a scheduled time period if the error on the first path is of the first error type. The method further includes resuming the access via a second path after the scheduled time period expires. With embodiments of the present disclosure, the capability of processing the problem of failure in accessing a storage device and the stability in accessing a storage device can be improved.

20 Claims, 4 Drawing Sheets

METHOD, ELECTRONIC DEVICE, AND COMPUTER PROGRAM PRODUCT FOR ACCESSING STORAGE DEVICE

CROSS-REFERENCE TO RELATED APPLICATION

This patent application claims priority, under 35 U.S.C. § 119, of Chinese Patent Application No. 202210179300.5, filed Feb. 25, 2022, which is incorporated by reference in its entirety.

TECHNICAL FIELD

Embodiments of the present disclosure relate to the field of computers and, more particularly, to a method, an electronic device, an apparatus, a medium, and a computer program product for accessing a storage device.

BACKGROUND

With the development of data storage technologies, a variety of data storage systems based on a Redundant Array of Independent Disks (RAID) have been developed, which improves data reliability. But there are still some situations in which damages may be caused to a disk, such as a powered operation (also known as hot plug) when expanding the disk. In conventional disk array access (e.g., read/write) techniques, if more than 2 disks become damaged, access to the entire disk array will be affected, resulting in poor user experience. Accordingly, there is an urgent need for a technique for accessing a storage device that can be used to improve the capability of processing the problem of failure in accessing a storage device.

SUMMARY OF THE INVENTION

Embodiments of the present disclosure provide a method, an electronic device, an apparatus, a medium, and a computer program product for accessing a storage device.

According to a first aspect of the present disclosure, a method for accessing a storage device is provided. The method includes determining, in response to an access to the storage device via a first path being determined as timeout, whether an error on the first path is of a first error type. The method further includes causing the access to be suspended for at least a scheduled time period if the error on the first path is of the first error type. The method further includes resuming the access via a second path after the scheduled time period expires.

According to a second aspect of the present disclosure, an electronic device is also provided. The electronic device includes a processor and a memory coupled to the processor, and the memory has instructions stored therein which, when executed by the processor, cause the device to perform actions. The actions include determining, in response to an access to a storage device via a first path being determined as timeout, whether an error on the first path is of a first error type. The actions further include causing the access to be suspended for at least a scheduled time period if the error on the first path is of the first error type. The actions further include resuming the access via a second path after the scheduled time period expires.

According to a third aspect of the present disclosure, an apparatus for accessing a storage device is provided. The apparatus includes an error type determination module configured to determine, in response to an access to the storage device via a first path being determined as timeout, whether an error on the first path is of a first error type. The apparatus further includes an access suspension module configured to cause the access to be suspended for at least a scheduled time period if the error on the first path is of the first error type. The apparatus further includes an access resumption module configured to resume the access via a second path after the scheduled time period expires.

According to a fourth aspect of the present disclosure, a computer-readable storage medium is provided, which includes machine-executable instructions that, when executed by a device, cause the device to perform the method according to the first aspect of the present disclosure.

According to a fifth aspect of the present disclosure, a computer program product is provided. The computer program product is tangibly stored on a computer-readable medium and includes machine-executable instructions, where the machine-executable instructions, when executed by a device, cause the device to execute the method according to the first aspect of the present disclosure.

The Summary of the Invention part is provided to introduce the selection of concepts in a simplified form, which will be further described in the Detailed Description below. The Summary of the Invention part is neither intended to identify key features or essential features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar drawing marks represent identical or similar elements, in which.

In all of the accompanying drawings, identical or similar reference numerals indicate identical or similar elements.

DETAILED DESCRIPTION

Figure 1:
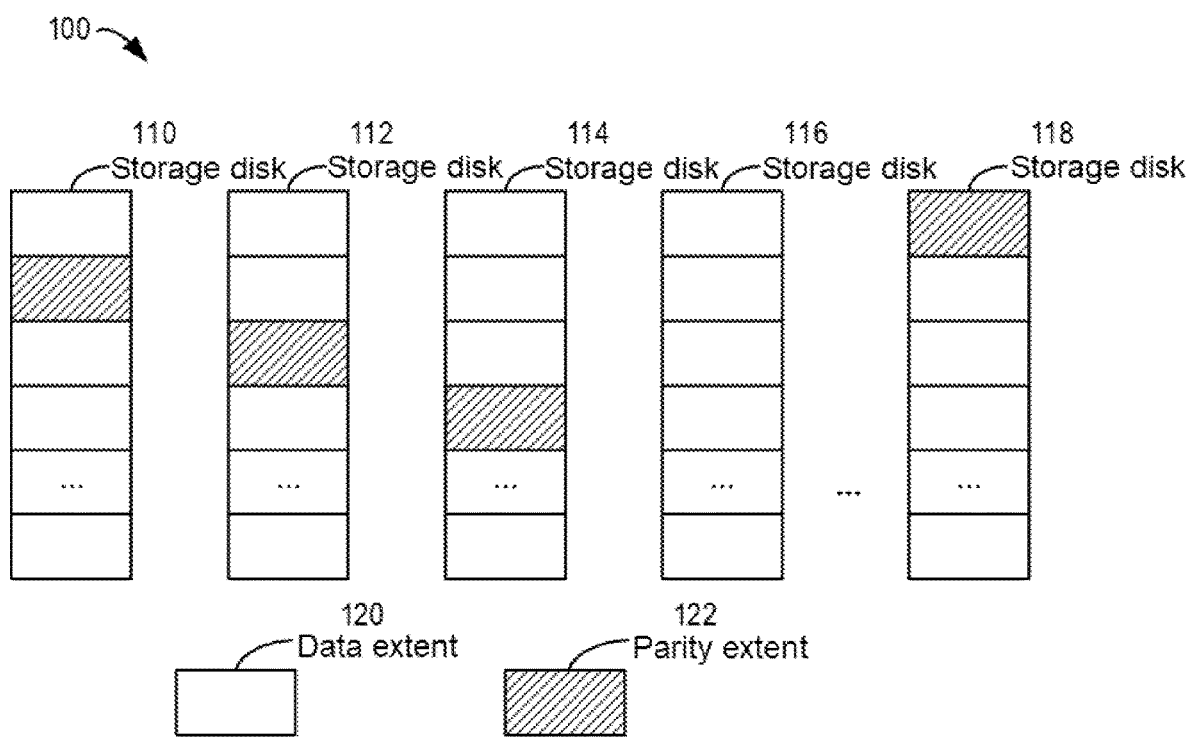
FIG. 1 illustrates a schematic diagram of an example environment in which embodiments of the present disclosure can be implemented.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

The inventors note that when writing data to storage devices using the SAS (Serial Attached SCSI) protocol, even when each storage device has two or more input/output (IO) ports, there is still a high probability that the writing of data cannot be successfully completed. In one case, an interruption occurs while data is being written on one path of a storage device, and it is not possible to switch to another path in time. This is because conventional techniques for controlling access to a storage device cannot solve the problem of crash of the entire storage device due to congestion caused by the continued influx of written data after one path is interrupted. Accordingly, there is an urgent need for a technique for accessing a storage device that can be used to improve the capability of processing the problem of failure in accessing a storage device.

In view of this, the method of the present disclosure provides a method for accessing a storage device. With this method, after an access to a storage device has timed out, the cause of the timeout can be determined. If the cause of the timeout is a physical connection failure on a path, the storage device may first be frozen for a period of time during which a new influx of data frames will not be accepted and will not be written to the storage device via another path. Thus, this effectively protects the storage device from crashing easily.

In the description below, some embodiments will be discussed with reference to write accesses. However, it should be understood that this is only for a better understanding of the principles and ideas of the embodiments of the present disclosure, and is not intended to limit the scope of the present disclosure in any way.

FIG. 1 illustrates a schematic diagram of an example environment in which embodiments of the present disclosure can be implemented. As shown in FIG. 1, storage device 100 may be a redundant array of independent disks (RAID) device including a plurality of storage disks 110, 112, 114, 116, . . . , and 118. Each storage disk may include a plurality of extents, and the plurality of extents may be managed based on a mapped RAID. A storage resource pool may be created based on a predetermined storage array standard. For example, when using a 4D+1P (4 extents for data storage and 1 extent for parity storage) RAID standard, one stripe may be created using 5 extents located on 5 storage disks, respectively. At this point, 4 extents in the stripe may be used to store data (as shown by legend 120), and 1 extent may be used to store parities (as shown by legend 122). Storage device 100 may have 2 IO ports for connection to an external device (e.g., a host). Each IO port has a separate path. Data accesses the storage device via the paths.

Figure 2:
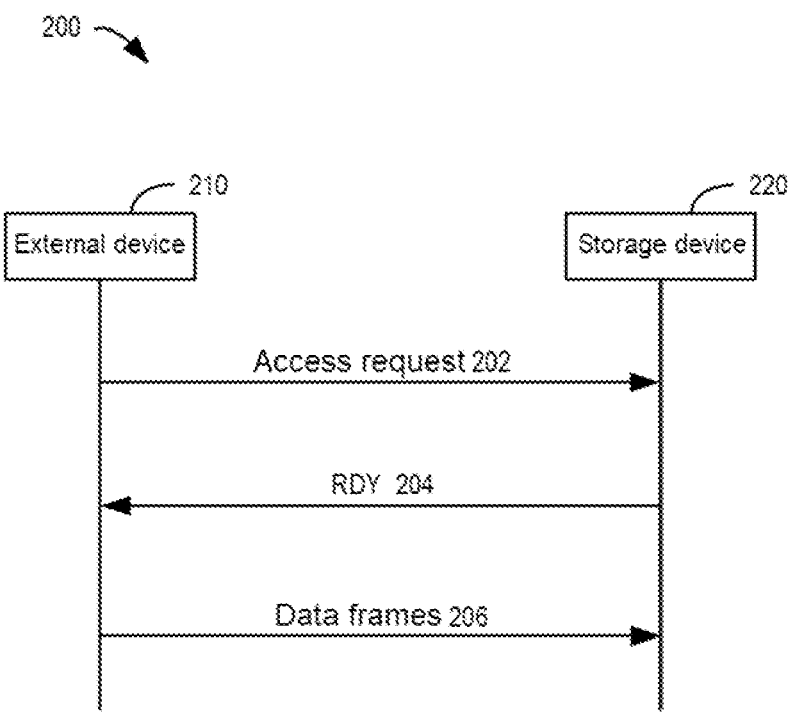
FIG. 2 schematically illustrates a schematic diagram of a protocol for performing a write operation on a storage device according to an embodiment of the present disclosure.

FIG. 2 schematically illustrates a schematic diagram of a protocol for performing a write operation on a storage device according to an embodiment of the present disclosure.

Upon successful establishment of a connection, storage device 220 receives access request 202 from external device 210 and accepts access request 202, and sends ready (RDY) response 204 to external device 210. At this point, data frames 206 (or data, with no distinction being made hereinafter between data and data frames) are written to storage device 220 in sequence via a first path (also called an activated path). When the connection is disconnected (e.g., physically disconnected), storage device 220 enables a second path (also known as a standby path) to write the data. Typically, in order to protect storage device 220, there is a frozen time during which no operations can be performed until the second path is enabled, in which case no ongoing, interrupted write operations and subsequent access requests can be processed.

It will be understood that the frozen time may vary depending on the type, brand, etc., of the storage device, but in any case, the frozen time is in units of seconds (e.g., 5 seconds, 10 seconds, and so on). Therefore, during this period of time, data cannot be written to the storage device in time even if the second path is good. This makes the two paths of the storage device not give full play to their advantages.

Figure 3:
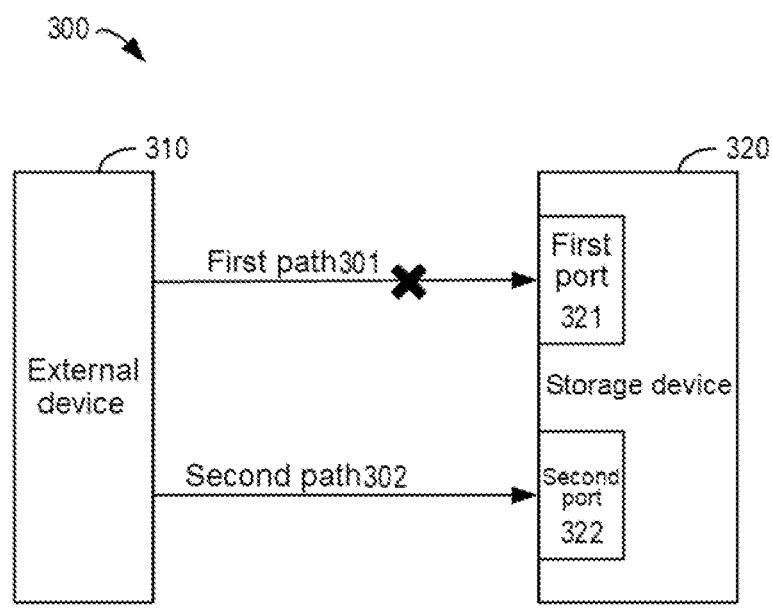
FIG. 3 schematically illustrates a schematic diagram of a first path and a second path according to an embodiment of the present disclosure.

FIG. 3 schematically illustrates a schematic diagram of a first path and a second path according to an embodiment of the present disclosure. As shown, when first path 301 connecting external device 310 to storage device 320 is interrupted, second path 302 connecting external device 310 to storage device 320 is enabled. First path 301 is connected to storage device 320 at first port 321, and second path 302 is connected to storage device 320 at second port 322. First port 321 and second port 322 may each be connected to a different storage disk of storage device 320.

Figure 4:
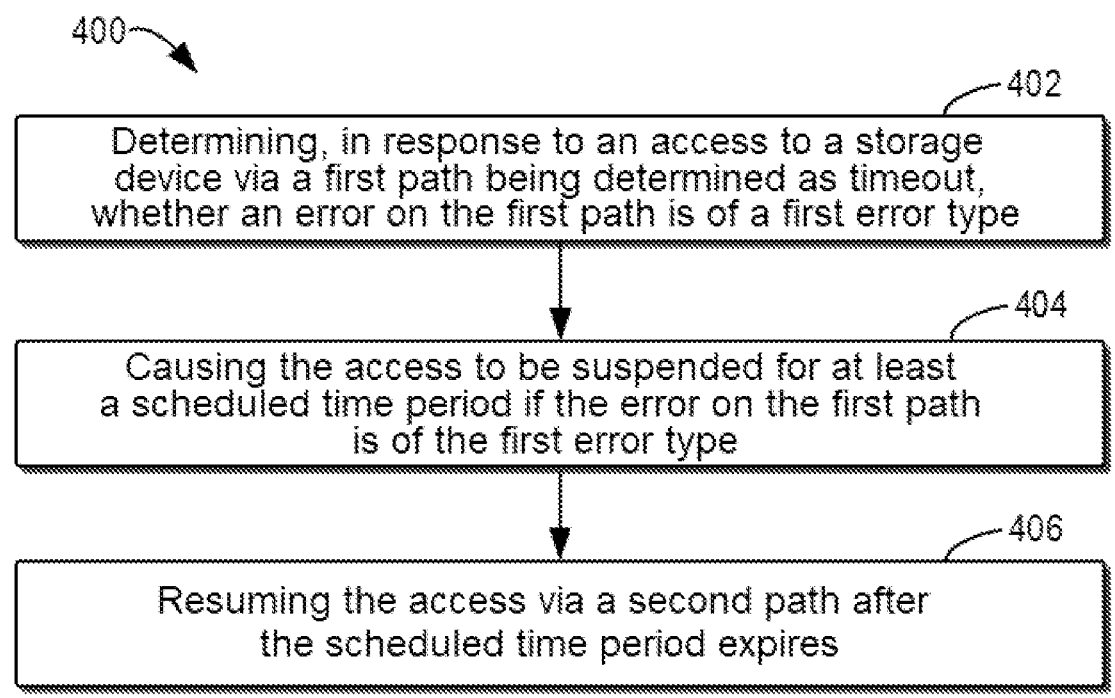
FIG. 4 schematically illustrates a flow chart of a method for accessing a storage device according to an example implementation of the present disclosure.

FIG. 4 schematically illustrates a flow chart of method 400 for accessing a storage device according to an example implementation of the present disclosure.

At block 402, in response to an access to the storage device via a first path being determined as timeout, it is determined whether an error on the first path is of a first error type.

In some embodiments, it may be set such that a timeout is determined if the storage device cannot be accessed normally for longer than a threshold time. After the access is determined as timeout, the type of the error on the first path is determined (e.g., detected). In some embodiments, this first error type includes no connection. No connection indicates a physically disconnected state. As an example only, no connection may refer to a cable being pulled out of a port.

At block 404, if the error on the first path is of the first error type, the access is caused to be suspended for at least a scheduled time period.

In some embodiments, if the error is determined to be of the first error type, the access is suspended for a time period greater than or equal to the scheduled time period. In a manner, a timer may be set and the expiration of the timer means that this scheduled time period has elapsed. As an example, this scheduled time period may be acquired by querying characteristic parameters of the storage device.

At block 406, the access is resumed via a second path after the scheduled time period expires.

This scheduled time period is much less than the frozen time mentioned above. In some embodiments, the scheduled time period is in units of milliseconds. Therefore, it is possible to resume the access on the second path very quickly.

In this way, with the example implementation of the present disclosure, it is possible to make the second path of the storage device fully used, thus replacing in time the first path that has lost connection. Also in this manner, the stability of access to the storage system can be improved, so that when the storage device is expanded, the damage to the storage device caused by powered operations can be reduced.

In some embodiments, the storage device may be marked as being in a frozen state if the error on the first path is of the first error type, where the storage device is not responsive to any access request while in the frozen state. For example, the storage device is not responsive to either a write request or a read request.

In some embodiments, the storage device being not responsive to any access may include suspending an ongoing access and denying a new access to the storage device, for example, suspending data that is being written.

In some embodiments, data for the access may be held while the access is suspended, and resuming the access may include accessing the storage device via the second path using the held data. As an example, when the access is to write data, suppose that 1000 data frames are to be written to the storage system, but the writing is suspended when 800 data frames have been written, then the remaining 200 data frames may be held. When the writing is resumed on the second path, the 200 data frames that were previously held are continued to be written.

In some embodiments, the second access path may be disabled if the error is determined to be of a second error type different from the first error type. If the error is of a type other than the first error type, the second access path may be marked as disabled. In addition, an instruction indicating the timeout may be returned to the operating system for subsequent processing. This has the advantage that the operating system can process the timeout in time without waiting for the storage device to crash.

In some embodiments, the storage device may be released from the frozen state when the access is resumed.

In some embodiments, the storage device may be a disk in a redundant array of independent disks (RAID).

In some embodiments, a path connected to an external device through a first access port of the storage device may be determined as the first path, and another path connected to the external device through a second access port of the storage device may be determined as the second path.

In some embodiments, the first error type may include a physical connectivity failure of the first path or the second path. For example, a cable is pulled out of a port.

It will be understood that unlike conventional methods that can only process the case where 2 damaged disks exist on a storage device, the use of method 400 can avoid crashing of a storage device even in the case where a larger number of damaged disks exist on the storage device, thus further improving the stability in accessing the storage device.

Figure 5:
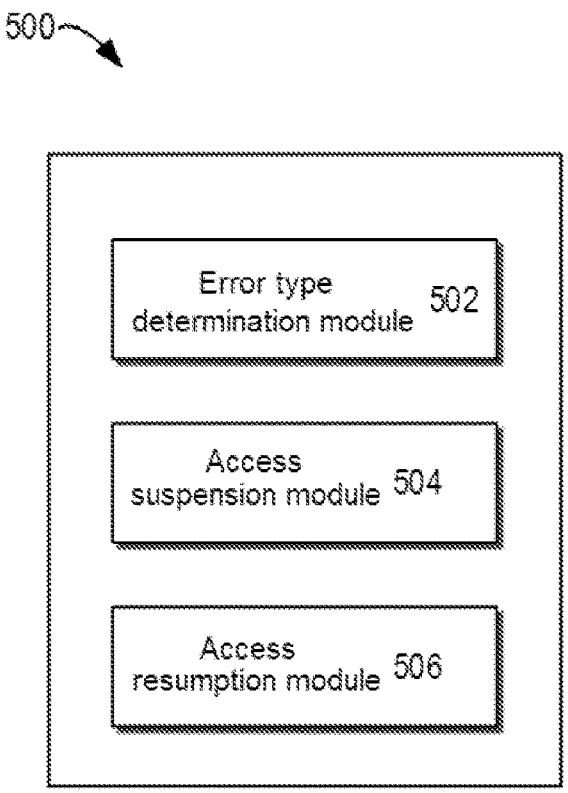
FIG. 5 schematically illustrates a block diagram of an apparatus for accessing a storage device according to an example implementation of the present disclosure.

FIG. 5 schematically illustrates a block diagram of apparatus 500 for accessing a storage device according to an example implementation of the present disclosure.

Error type determination module 502 is configured to determine, in response to an access to the storage device via a first path being determined as timeout, whether an error on the first path is of a first error type.

Access suspension module 504 is configured to cause the access to be suspended for at least a scheduled time period if the error on the first path is of the first error type.

Access resumption module 506 is configured to resume the access via a second path after the scheduled time period expires.

In some embodiments, access suspension module 504 may further be configured to mark the storage device as being in a frozen state if the error on the first path is of the first error type, where the storage device is not responsive to any access request while in the frozen state.

In some embodiments, the storage device being not responsive to any access may include suspending an ongoing access and denying a new access to the storage device, In some embodiments, access resumption module 506 may further be configured to hold data for the access while the access is suspended, and resuming the access includes accessing the storage device via the second path using the held data.

In some embodiments, access suspension module 504 may further be configured to disable the second access path if the error is determined to be of a second error type different from the first error type.

In some embodiments, access suspension module 504 may further be configured to release the storage device from the frozen state when the access is resumed.

In some embodiments, the storage device may be a disk in a redundant array of independent disks (RAID).

In some embodiments, a path connected to an external device through a first access port of the storage device may be determined as the first path, and another path connected to the external device through a second access port of the storage device may be determined as the second path.

In some embodiments, the first error type may include a physical connectivity failure of the first path or the second path.

It will be understood that apparatus 500 may also achieve at least one beneficial technical effect as can be achieved by method 400.

Figure 6:
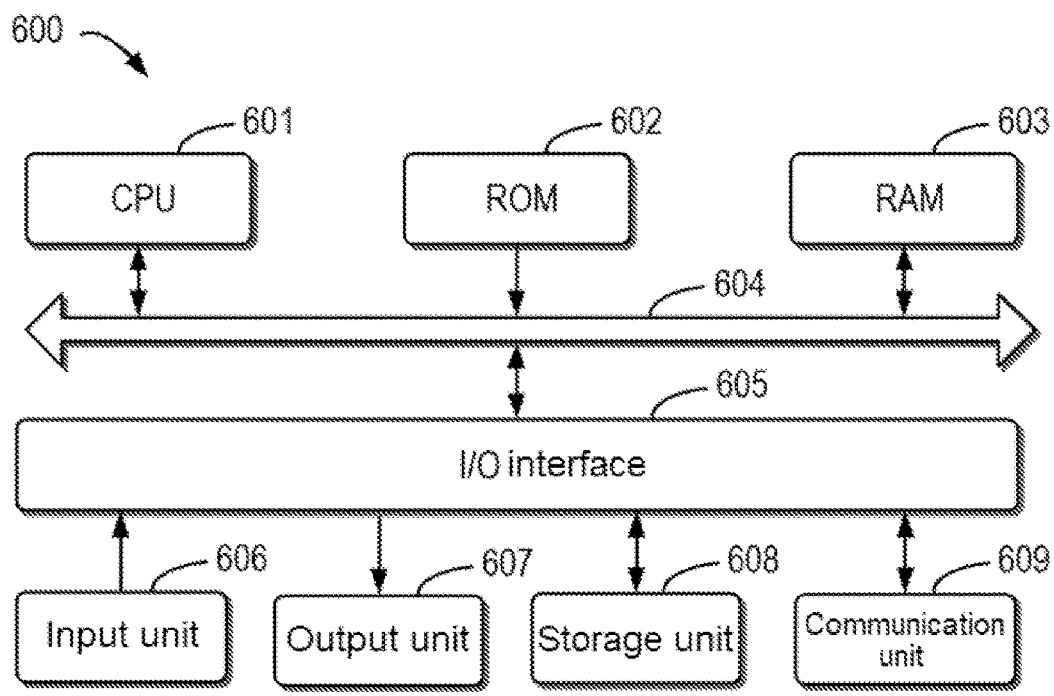
FIG. 6 schematically illustrates a block diagram of a device that can be used to implement embodiments of the present disclosure.

FIG. 6 illustrates a schematic block diagram of device 600 that may be used to implement embodiments of the present disclosure. Device 600 may be a device or apparatus as described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for accessing a storage device is provided. The method includes determining, in response to an access to the storage device via a first path being determined as timeout, whether an error on the first path is of a first error type. The method further includes causing the access to be suspended for at least a scheduled time period if the error on the first path is of the first error type. The method further includes resuming the access via a second path after the scheduled time period expires.

In certain embodiments, the method may include marking the storage device as being in a frozen state if the error on the first path is of the first error type, where the storage device is not responsive to any access request while in the frozen state.

In certain embodiments, the storage device being not responsive to any access includes suspending an ongoing access; and denying a new access for the storage device.

In certain embodiments, data for the access may be held while the access is suspended, and resuming the access includes accessing the storage device via the second path using the held data.

In certain embodiments, the method further includes disabling the second access path if the error is determined to be of a second error type different from the first error type.

In certain embodiments, the method further includes releasing the storage device from the frozen state when resuming the access.

In certain embodiments, the storage device is a disk in a redundant array of independent disks (RAID).

In certain embodiments, a path connected to an external device through a first access port of the storage device is determined as the first path, and another path connected to the external device through a second access port of the storage device is determined as the second path.

In some embodiments, the first error type includes a physical connectivity failure of the first path or the second path.

In a second aspect of the present disclosure, an electronic device is provided. The electronic device includes a processor and a memory coupled to the processor, and the memory has instructions stored therein which, when executed by the processor, cause the device to perform actions. The actions include determining, in response to an access to a storage device via a first path being determined as timeout, whether an error on the first path is of a first error type. The actions further include causing the access to be suspended for at least a scheduled time period if the error on the first path is of the first error type. The actions further include resuming the access via a second path after the scheduled time period expires.

In certain embodiments, the actions further include marking the storage device as being in a frozen state if the error on the first path is of the first error type, where the storage device is not responsive to any access request while in the frozen state.

In certain embodiments, the storage device being not responsive to any access includes suspending an ongoing access; and denying a new access for the storage device.

In certain embodiments, the actions further include holding data for the access while the access is suspended, and resuming the access includes accessing the storage device via the second path using the held data.

In certain embodiments, the method further includes disabling the second access path if the error is determined to be of a second error type different from the first error type.

In certain embodiments, the actions further include releasing the storage device from the frozen state when resuming the access.

In certain embodiments, the storage device is a disk in a redundant array of independent disks (RAID).

In certain embodiments, a path connected to an external device through a first access port of the storage device is determined as the first path, and another path connected to the external device through a second access port of the storage device is determined as the second path.

In some embodiments, the first error type includes a physical connectivity failure of the first path or the second path.

In an embodiment of the third aspect, an apparatus for accessing a storage device is provided. The apparatus includes an error type determination module configured to determine, in response to an access to the storage device via a first path being determined as timeout, whether an error on the first path is of a first error type. The apparatus further includes an access suspension module configured to cause the access to be suspended for at least a scheduled time period if the error on the first path is of the first error type. The apparatus further includes an access resumption module configured to resume the access via a second path after the scheduled time period expires.

In an embodiment of the fourth aspect, a computer-readable storage medium is provided. The computer-readable storage medium has one or more computer instructions stored thereon, wherein the one or more computer instructions are executed by a processor to implement the method according to the first aspect.

In an embodiment of the fifth aspect, a computer program product is provided. The computer program product includes one or more computer instructions, wherein the one or more computer instructions, when executed by a processor, implement the method according to the first aspect.

Although the present disclosure has been described using a language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A method for accessing a storage device, comprising:
 determining, in response to an access to the storage device via a first path being determined as timeout, whether an error on the first path is of a first error type;

causing the access to be suspended for at least a scheduled time period if the error on the first path is of the first error type; and resuming the access via a second path after the scheduled time period expires.

2. The method according to claim 1, further comprising:
marking the storage device as being in a frozen state if the error on the first path is of the first error type, wherein the storage device is not responsive to any access request while in the frozen state.

3. The method according to claim 2, wherein in response to the storage device being not responsive to any access, the method further comprises:
suspending an ongoing access; and
denying a new access for the storage device.

4. The method according to claim 1, further comprising:
withholding data for the access while the access is suspended; and
resuming the access comprises accessing the storage device via the second path using the withheld data.

5. The method according to claim 1, further comprising:
disabling the second access path if the error is determined to be of a second error type different from the first error type.

6. The method according to claim 2, further comprising:
releasing the storage device from the frozen state when resuming the access.

7. The method according to claim 1, wherein the storage device is a disk in a redundant array of independent disks (RAID).

8. The method according to claim 1, wherein a path connected to an external device through a first access port of the storage device is determined as the first path, and another path connected to the external device through a second access port of the storage device is determined as the second path.

9. The method according to claim 1, wherein the first error type comprises a physical connectivity failure of the first path or the second path.

10. An electronic device, comprising:
a processor; and
a memory coupled to the processor, wherein the memory has instructions stored therein, which when executed by the processor, cause the processor to perform actions, the actions comprising:
determining, in response to an access to a storage device via a first path being determined as timeout, whether an error on the first path is of a first error type;
causing the access to be suspended for at least a scheduled time period if the error on the first path is of the first error type; and
resuming the access via a second path after the scheduled time period expires.

11. The electronic device according to claim 10, wherein the actions further comprise:
marking the storage device as being in a frozen state if the error on the first path is of the first error type, wherein the storage device is not responsive to any access request while in the frozen state.

12. The electronic device according to claim 11, wherein in response to the storage device being not responsive to any access, the actions further comprise:
suspending an ongoing access; and
denying a new access for the storage device.

13. The electronic device according to claim 10, wherein the actions further comprise:
withholding data for the access while the access is suspended; and
resuming the access comprises accessing the storage device via the second path using the withheld data.

14. The electronic device according to claim 10, wherein the actions further comprise:
disabling the second access path if the error is determined to be of a second error type different from the first error type.

15. The electronic device according to claim 11, wherein the actions further comprise:
releasing the storage device from the frozen state when resuming the access.

16. The electronic device according to claim 10, wherein the storage device is a disk in a redundant array of independent disks (RAID).

17. The electronic device according to claim 10, wherein a path connected to an external device through a first access port of the storage device is determined as the first path, and another path connected to the external device through a second access port of the storage device is determined as the second path.

18. The electronic device according to claim 10, wherein the first error type comprises a physical connectivity failure of the first path or the second path.

19. A non-transitory computer-readable storage medium having instructions stored therein, which when executed by a processor, cause the processor to perform actions of accessing a storage device, the actions comprising:
determining, in response to an access to the storage device via a first path being determined as timeout, whether an error on the first path is of a first error type;
causing the access to be suspended for at least a scheduled time period if the error on the first path is of the first error type; and
resuming the access via a second path after the scheduled time period expires.

20. The computer-readable storage medium of claim 19, wherein the actions further comprise:
marking the storage device as being in a frozen state if the error on the first path is of the first error type, wherein the storage device is not responsive to any access request while in the frozen state.

* * * * *